(12) United States Patent
Funakoshi

(10) Patent No.: US 12,703,054 B2
(45) Date of Patent: Aug. 11, 2026

(54) COOLANT TREATMENT APPARATUS

(71) Applicant: DMG MORI CO., LTD., Nara (JP)

(72) Inventor: Genki Funakoshi, Nara (JP)

(73) Assignee: DMG MORI CO., LTD., Nara (JP)

( * ) Notice: Subject to any disclaimer, the term of this patent is extended or adjusted under 35 U.S.C. 154(b) by 308 days.

(21) Appl. No.: 18/683,734

(22) PCT Filed: Aug. 20, 2021

(86) PCT No.: PCT/JP2021/030631

§ 371 (c)(1),
(2) Date: Feb. 14, 2024

(87) PCT Pub. No.: WO2023/021698

PCT Pub. Date: Feb. 23, 2023

(65) Prior Publication Data

US 2025/0360587 A1 Nov. 27, 2025

(51) Int. Cl.
*B23Q 11/10* (2006.01)
*B23Q 11/00* (2006.01)

(52) U.S. Cl.
CPC ...... *B23Q 11/1069* (2013.01); *B23Q 11/0057* (2013.01)

(58) Field of Classification Search
CPC . B23Q 11/1069; B23Q 11/0057; B23Q 11/10; Y02P 70/10
USPC .... 210/167.01, 167.02, 167.04, 167.05, 171, 210/191, 194, 195.1, 258
See application file for complete search history.

(56) References Cited

U.S. PATENT DOCUMENTS

| | | | |
|---|---|---|---|
| 5,112,479 | A * | 5/1992 | Srimongkolkul |
| 6,162,355 | A | 12/2000 | Mizuno et al. |
| 2014/0338765 | A1 | 11/2014 | Kono et al. |
| 2024/0075574 | A1 | 3/2024 | Kanazawa |

FOREIGN PATENT DOCUMENTS

| | | | |
|---|---|---|---|
| CN | 113226636 | A | 8/2021 |
| JP | H11138051 | A | 5/1999 |
| JP | 2001-105277 | A | 4/2001 |
| JP | 2010188466 | A | 9/2010 |
| JP | 6854390 | B1 | 4/2021 |
| WO | 2013038567 | A1 | 3/2013 |
| WO | 2020152834 | A1 | 7/2020 |

* cited by examiner

*Primary Examiner* — Madeline Gonzalez
(74) *Attorney, Agent, or Firm* — IP Business Solutions, LLC.

(57) ABSTRACT

The coolant treatment apparatus includes a first flow channel through which coolant flows, a first filter which is provided on the path of the first flow channel, a second flow channel which is branched from the first flow channel and through which coolant from the first flow channel flows, a first coolant discharge unit which discharges the coolant toward a machining point of a workpiece, and a first pump which is provided on the path of the second flow channel and configured to pump the coolant toward the first coolant discharge unit, a third flow channel which is branched from the first flow channel and through which the coolant from the first flow channel flows, a second coolant discharge unit which discharges the coolant supplied from the third flow channel, and a second filter which is cleaned by the coolant discharged from the second coolant discharge unit.

5 Claims, 5 Drawing Sheets

Figure 5:
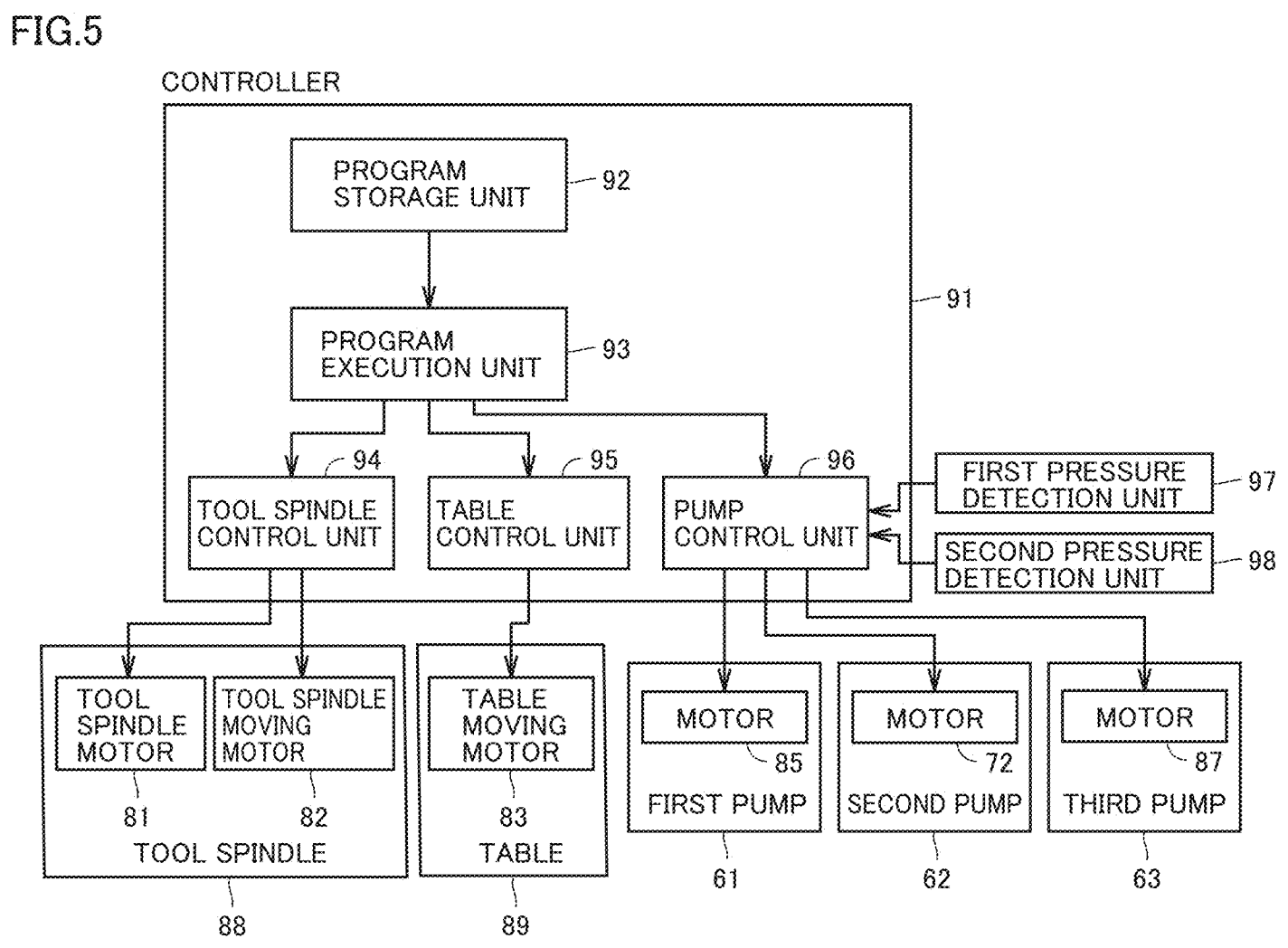

CONTROLLER
91
PROGRAM STORAGE UNIT
92
PROGRAM EXECUTION UNIT
93
TOOL SPINDLE CONTROL UNIT
94
TABLE CONTROL UNIT
95
PUMP CONTROL UNIT
96
FIRST PRESSURE DETECTION UNIT
97
SECOND PRESSURE DETECTION UNIT
98
MOTOR
87
THIRD PUMP
63
MOTOR
72
SECOND PUMP
62
MOTOR
85
FIRST PUMP
61
TABLE MOVING MOTOR
83
TABLE
89
TOOL SPINDLE MOVING MOTOR
82
TOOL SPINDLE MOTOR
81
TOOL SPINDLE
88

COOLANT TREATMENT APPARATUS

TECHNICAL FIELD

The present invention relates to a coolant treatment apparatus.

BACKGROUND ART

For example, Japanese Patent Application Laying-Open No. 2001-105277 (PTL 1) discloses a coolant supply device that includes a dirty tank configured to store used dirty coolant, a first pump configured to pump the dirty coolant in the dirty tank toward a clean tank, a filter provided on the path of a coolant flow from the dirty tank toward the clean tank, and a second pump configured to pump regenerated coolant in the clean tank toward a machine side.

CITATION LIST

Patent Literature

[PTL 1] Japanese Patent Laying-Open No. 2001-105277

SUMMARY OF INVENTION

Technical Problem

As disclosed in PTL 1, there is known a coolant treatment apparatus that supplies the coolant cleaned by filtration using a filter toward a machine side (a machining area of a machine tool main body). In such a coolant treatment apparatus, if the cleaned coolant is supplied to the machine side and is used for cleaning by the filter at the same time, it is possible that the coolant may not be discharged at an appropriate discharge pressure at the machine side.

The present invention has been accomplished in view of the aforementioned problem, and an object of the present invention is to provide a coolant treatment apparatus capable of appropriately controlling a discharge pressure of coolant.

Solution to Problem

A coolant treatment apparatus according to the present invention includes a first flow channel through which coolant flows, a first filter which is provided on the path of the first flow channel, a second flow channel which is branched from the first flow channel and through which coolant from the first flow channel flows, a first coolant discharge unit which discharges the coolant toward a machining point of a workpiece, a first pump which is provided on the path of the second flow channel and configured to pump the coolant toward the first coolant discharge unit, a third flow channel which is branched from the first flow channel and through which the coolant from the first flow channel flows, a second coolant discharge unit which discharges the coolant supplied from the third flow channel, and a second filter which is cleaned by the coolant discharged from the second coolant discharge unit.

According to the coolant treatment apparatus configured as described above, the coolant passing through the first filter and flowing through the first flow channel is supplied to the first coolant discharge unit through the second flow channel, whereby clean coolant is discharged from the first coolant discharge unit toward the machining point of the workpiece, and the coolant passing through the first filter and flowing through the first flow channel is supplied to the second coolant discharge unit through the third flow channel, whereby clean coolant is discharged from the second coolant discharge unit toward the second filter. In such a configuration, by operating the first pump which is provided on the path of the second flow channel, it is possible to preferentially supply the coolant flowing through the first flow channel to the first coolant discharge unit through the second flow channel. Thereby, it is possible to appropriately control the pressure of the coolant discharged from the first coolant discharge unit toward the machining point of the workpiece.

Preferably, the coolant treatment apparatus further includes a first tank configured to store coolant, and a chip conveyor which is housed in the first tank and configured to receive chips and the coolant discharged from a machine tool main body. The second filter is built in the chip conveyor and is provided on the path of a coolant flow from the chip conveyor toward the first tank.

According to the coolant treatment apparatus configured as described above, clean coolant can be discharged from the second coolant discharge unit toward the second filter built in the chip conveyor.

Preferably, the coolant treatment apparatus further includes a fourth flow channel which is branched from the third flow channel and configured to guide the coolant from the third flow channel to the first tank, and a flow control unit which is provided on the path of the fourth flow channel and acts as a resistance to a coolant flow in the fourth flow channel.

According to the coolant treatment apparatus configured as described above, by using the flow control unit to hinder the flow of coolant in the fourth flow channel, it is possible to appropriately control the pressure of coolant discharged from the second coolant discharge unit toward the second filter.

Preferably, the coolant treatment apparatus further includes a second tank which is configured to store coolant and is connected to the first flow channel, a second pump which is provided on the path of the first flow channel and configured to pump the coolant stored in the second tank toward the first filter, a fifth flow channel which is provided between the first tank and the second tank, and a third pump which is provided on the path of the fifth flow channel and configured to pump the coolant from the first tank toward the second tank.

According to the coolant treatment apparatus configured as described above, by operating the third pump and the second pump, the coolant is circulated in an annular coolant circulation path formed by the first tank, the fifth flow channel, the second tank, the first flow channel, the third flow channel, and the fourth flow channel in this order. During this time, the coolant passes through the first filter, whereby the coolant stored in the first tank and the second tank can be cleaned.

Preferably, the coolant treatment apparatus further includes a pressure detection unit which is provided on the path of the third flow channel and configured to detect a pressure of the coolant supplied to the second coolant discharge unit, and a controller which controls an output of the second pump based on the pressure of the coolant detected by the pressure detection unit.

According to the coolant treatment apparatus configured as described above, by controlling the output of the second pump, the pressure of coolant discharged from the second coolant discharge unit toward the second filter can be appropriately controlled regardless of the amount of coolant supplied to the first coolant discharge unit.

Advantageous Effects of Invention

As described above, according to the present invention, it is possible to provide a coolant treatment apparatus capable of appropriately controlling the discharge pressure of coolant.

BRIEF DESCRIPTION OF DRAWINGS

FIG. 2 is a rear view illustrating a machine tool equipped with the coolant treatment apparatus illustrated in FIG. 1;

FIG. 5 is a block diagram illustrating a control system of a machine tool equipped with the coolant treatment apparatus illustrated in FIG. 1.

DESCRIPTION OF EMBODIMENTS

Figure 1:
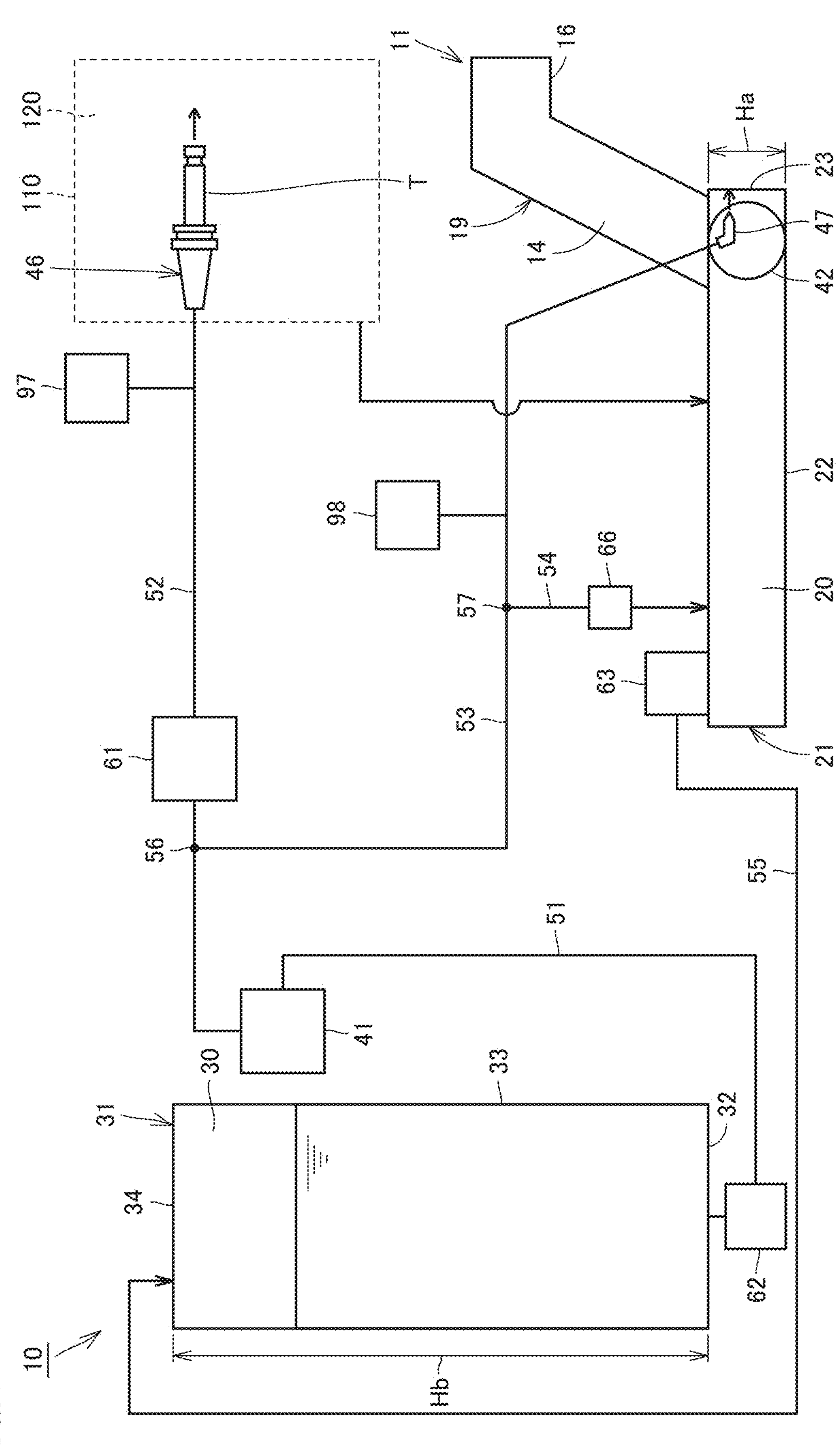
FIG. 1 is a system diagram illustrating a coolant treatment apparatus according to an embodiment of the present invention.

Embodiments of the present invention will be described with reference to the drawings. In the following drawings, the same or corresponding members are denoted by the same reference numerals.

Figure 2:
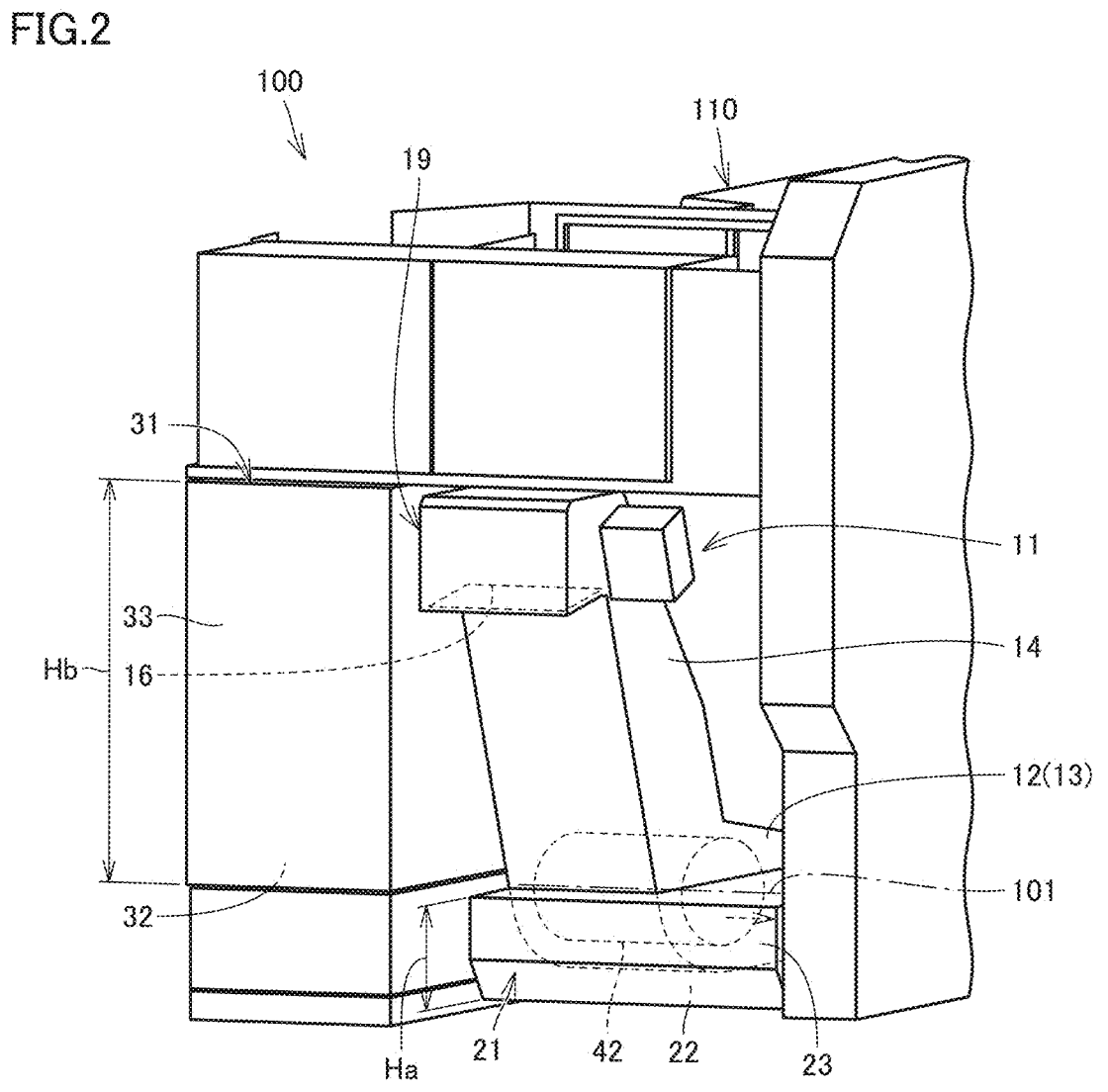

FIG. 1 is a system diagram illustrating a coolant treatment apparatus according to an embodiment of the present invention. FIG. 2 is a rear view illustrating a machine tool equipped with the coolant treatment apparatus illustrated in FIG. 1.

With reference to FIGS. 1 and 2, a coolant treatment apparatus 10 according to the present embodiment is used in a machine tool 100. The machine tool 100 is a machining center configured to machine a workpiece by bringing a rotating tool into contact with the workpiece. The machine tool 100 is an NC (Numerically Controlled) machine tool in which various operations for machining a workpiece are automated by computer numerical control.

The machine tool equipped with the coolant treatment apparatus according to the present invention is not limited to a machining center, and may be a lathe configured to machine a workpiece by bringing a tool into contact with a rotating workpiece, or may be a composite machining machine having a turning function and a milling function, or an AM/SM hybrid machining machine that can perform an AM (Additive Manufacturing) process and an SM (Subtractive Manufacturing) process to a workpiece.

The machine tool 100 includes a machine tool main body 110 and a coolant treatment apparatus 10. The machine tool main body 110 is configured to machine a workpiece.

The machine tool main body 110 includes a main body cover that defines an outer appearance of the machine tool 100 and forms a workpiece machining area 120, a tool retaining unit (a tool spindle 88 in FIG. 5) for retaining a tool in the machining area 120, and a workpiece retaining unit (a table 89 in FIG. 5) for retaining a workpiece in the machining area 120.

The coolant treatment apparatus 10 is provided in parallel with the machine tool main body 110. The coolant treatment apparatus 10 is configured to treat coolant used in the workpiece machining in the machine tool main body 110. The coolant discharged from the machine tool main body 110 during the workpiece machining is guided to the coolant treatment apparatus 10, and stored therein. The coolant treatment apparatus 10 cleans the coolant received from the machine tool main body 110, and supplies clean coolant to the machine tool main body 110.

The coolant treatment apparatus 10 includes a chip conveyor 11. The chip conveyor 11 is configured to discharge chips and coolant generated during the workpiece machining in the machining area 120 to the outside of the machine tool 100.

The chip conveyor 11 includes a cover body 19 and a conveying device (not shown). The cover body 19 defines an outer appearance of the chip conveyor 11. The cover body 19 forms an internal space in which the conveying device is disposed.

The cover body 19 includes a horizontal portion 12 and a rising portion 14. The horizontal portion 12 extends in the horizontal direction. The rising portion 14 rises from one end of the horizontal portion 12 which extends in the horizontal direction, and extends obliquely upward. As a whole, the cover body 19 is bent between the horizontal portion 12 and the rising portion 14.

The cover body 19 is provided with a chip reception port 13 and a chip discharge port 16. The chip reception port 13 is provided in the horizontal portion 12. The chip reception port 13 is formed as an opening that opens upward. The chip discharge port 16 is provided in the rising portion 14. The chip discharge port 16 is provided at a distal end of the rising portion 14 that extends obliquely upward from the horizontal portion 12. The chip discharge port 16 is formed as an opening that opens downward.

The chip conveyor 11 further includes a second filter 42. The second filter 42 is built in the chip conveyor 11. The second filter 42 is housed in the cover body 19. The second filter 42 is disposed at the bent portion between the horizontal portion 12 and the rising portion 14. The second filter 42 is disposed on the path of a coolant flow from the chip conveyor 11 toward the first tank 21.

The second filter 42 has a cylindrical shape around a central axis 101. The central axis 101 extends in the horizontal direction. The second filter 42 is supported inside the cover body 19 so as to be rotatable about the central axis 101. The second filter 42 is driven to rotate about the central axis 101 by power transmitted from the conveying device (not shown).

The chip conveyor 11 is positioned with respect to the machine tool main body 110 in such a manner that the chip reception port 13 opens right beneath the machining area 120. A chip bucket for collecting chips is disposed below the chip discharge port 16.

The chips and the coolant discharged from the machining area 120 are received by the cover body 19 through the chip reception port 13. The chips are conveyed by a conveying device (not shown) from the horizontal portion 12 toward the rising portion 14, and are collected in a chip bucket after passing through the chip discharge port 16. The coolant is filtered by entering the inside of the second filter 42 from the outside thereof. The coolant cleaned by the second filter 42 is discharged from the second filter 42 to the first tank 21.

The coolant treatment apparatus 10 further includes a first tank 21 and a second tank 31. The first tank 21 and the second tank 31 each have a box shape, and are configured to store coolant.

The chip conveyor 11 is housed in the first tank 21. The chip conveyor 11 is provided at a position overlapping with the first tank 21 in a top view. The second tank 31 is provided in a separate form from the chip conveyor 11. The second tank 31 is provided at a position where it does not overlap with the chip conveyor 11 in the top view.

The first tank 21 has a bottom portion 22 and a side portion 23. The bottom portion 22 is disposed at the bottom of the first tank 21. The bottom portion 22 has, for example, a rectangular shape in a top view. The side portion 23 rises from the peripheral edge of the bottom portion 22. A lower end of the side portion 23 is connected to the bottom portion 22. A storage space 20 capable of storing coolant is formed on the bottom portion 22 and surrounded by the side portion 23.

The first tank 21 has a tank height Ha. The tank height Ha corresponds to the maximum length of the side portion 23 in the vertical direction.

Figure 3:
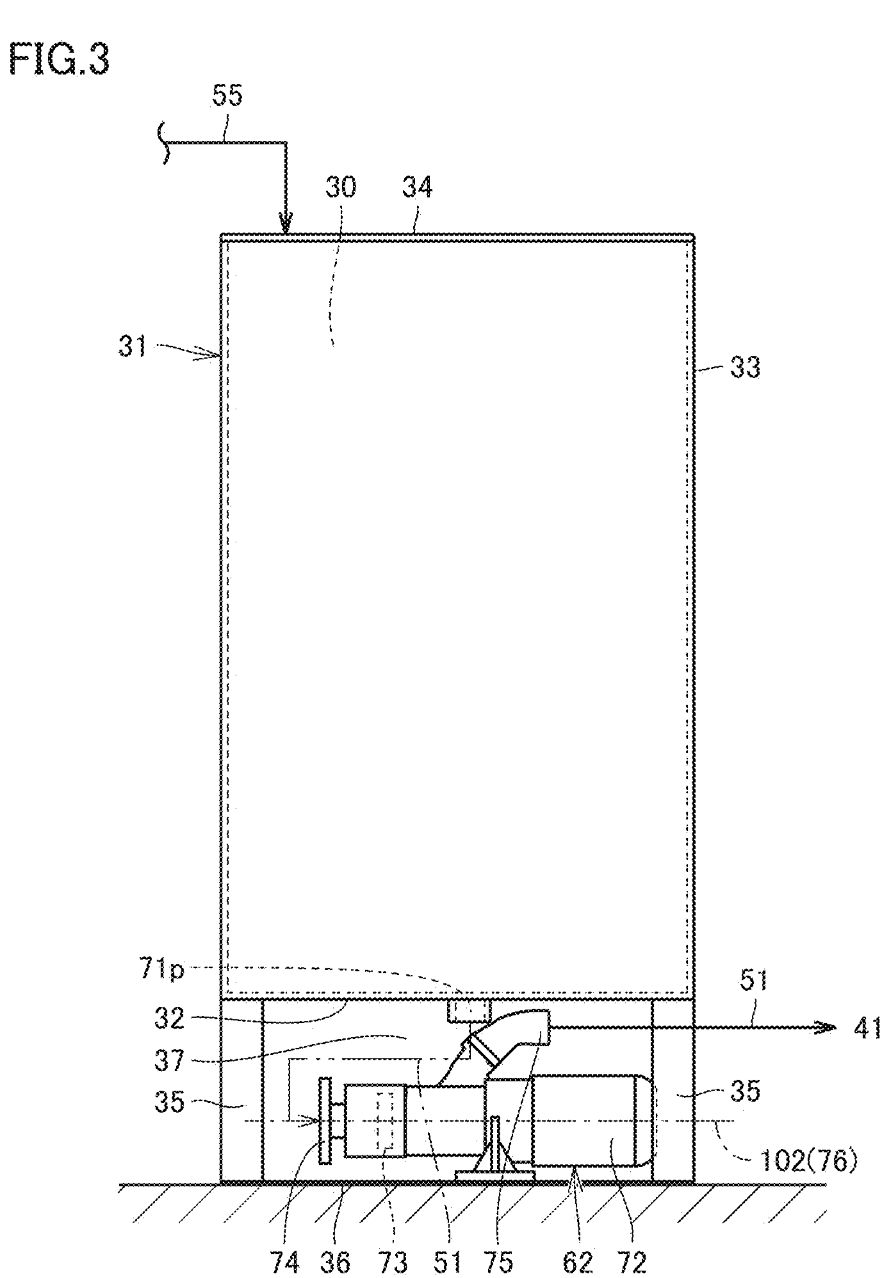
FIG. 3 is a side view illustrating a second tank in FIG. 1.
Figure 4:
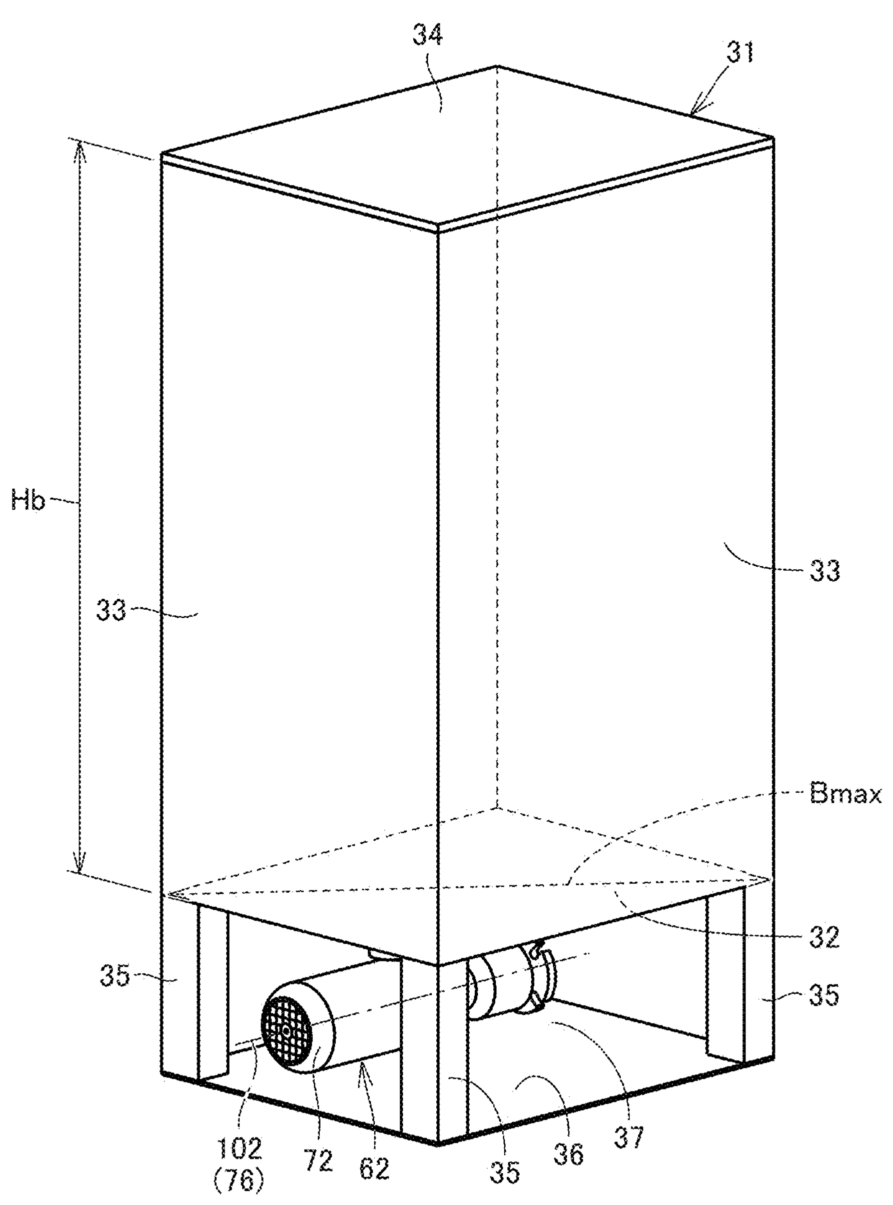
FIG. 4 is a perspective view illustrating a second tank in FIG. 1.

FIG. 3 is a side view illustrating the second tank in FIG. 1. FIG. 4 is a perspective view illustrating the second tank in FIG. 1.

With reference to FIGS. 3 and 4, the second tank 31 includes a bottom portion 32 and a side portion 33. The bottom portion 32 is disposed at the bottom of the second tank 31. As a representative example, the bottom portion 32 has a rectangular shape in the top view. The bottom portion 32 is disposed parallel to the horizontal plane. The side portion 33 rises from the peripheral edge of the bottom portion 32. A lower end of the side portion 33 is connected to the bottom portion 32. A storage space 30 capable of storing coolant is formed on the bottom portion 32 and surrounded by the side portion 33.

The second tank 31 further includes a top portion 34. The top portion 34 is disposed on the ceiling of the second tank 31. The top portion 34 faces the bottom portion 32 in the vertical direction. The top portion 34 is detachably attached to an upper end of the side portion 33. The top portion 34 constitutes a lid that closes an upper opening of the side portion 33.

The second tank 31 has a tank height Hb. The tank height Hb corresponds to the maximum length of the side portion 33 in the vertical direction. The second tank 31 is higher than the first tank 21. The tank height Hb is greater than the tank height Ha (Hb>Ha).

As illustrated in FIG. 4, the maximum length Hb of the side portion 33 in the vertical direction is greater than a length Bmax of a straight line connecting the two most distant points on the peripheral edge of the bottom portion 32 in the top view (Hb>Bmax). Bmax corresponds to the length between two diagonal corners on the bottom portion 32 having a rectangular shape.

The maximum length Hb of the side portion 33 in the vertical direction may be greater than 1.2 times the length Bmax of the straight line connecting the two most distant points on the peripheral edge of the bottom portion 32 in the top view (Hb>1.2×Bmax). The maximum length Hb of the side portion 33 in the vertical direction may be equal to or less than 2 times the length Bmax of the straight line connecting the two most distant points on the peripheral edge of the bottom portion 32 in the top view (Hb≤2×Bmax), or may be equal to or less than 1.5 times the length Bmax (Hb≤1.5×Bmax).

The bottom portion 32 may be disposed obliquely with respect to the horizontal plane. In such a configuration, when the heights of the upper ends of the side portions 33 are equal to each other, the maximum length Hb of the side portion 33 in the vertical direction is the length in the vertical direction of the side portions 33 rising from the peripheral edge of the bottom portion 32 at the lowest position of the bottom portion 32.

The shape of the bottom portion 32 in the top view is not limited to a rectangular shape, and may be, for example, a polygonal shape other than the rectangular shape, a circular shape, or an L shape. The straight line connecting the two most distant points on the peripheral edge of the bottom 32 and defining the length Bmax may pass through a position between the two most distant points on the peripheral edge of the bottom 32 that is not projected onto the bottom 32 in the vertical direction.

The area of the bottom portion 32 of the second tank 31 is smaller than the area of the bottom portion 22 of the first tank 21. The volume of the coolant in the second tank 31 is larger than the volume of the coolant in the first tank 21. The volume of the coolant in the second tank 31 may be equal to or smaller than the volume of the coolant in the first tank 21.

The coolant treatment apparatus 10 further includes a first flow channel 51, a second pump 62, and a first filter 41.

The first flow channel 51 is configured to allow the coolant to flow therethrough, and is constituted by a pipe member such as a steel pipe or a hose. The first flow channel 51 is connected to the second tank 31. The first flow channel 51 extends between the second tank 31 and a branch 56. The second pump 62 and the first filter 41 are provided on the path of the first flow channel 51. The second pump 62 is provided on the upstream side of the coolant flow in the first flow channel 51 than the first filter 41.

The first flow channel 51 includes a first pipe 71. The first pipe 71 is connected to the second tank 31. The first pipe 71 is connected to the bottom portion 32. A connection portion 71*p* that connects the first pipe 71 to the bottom portion 32 opens to the storage space 30 on the bottom portion 32. The first pipe 71 is connected between the second tank 31 and the second pump 62.

The second tank 31 is formed with a space 37 below the bottom portion 32. More specifically, the second tank 31 further includes a floor plate 36 and a plurality of pillars 35. The floor plate 36 is placed on a floor surface of a factory or the like where the coolant treatment apparatus 10 will be installed. Each pillar 35 extends in the vertical direction. An upper end of each pillar 35 is connected to the bottom portion 32, and a lower end of each pillar 35 is connected to the floor plate 36. The plurality of pillars 35 are spaced apart from each other. The space 37 is formed between the bottom portion 32 and the floor plate 36.

The second pump 62 is installed in the space 37. The second pump 62 includes a motor 72, a shaft 76, an impeller 73, a coolant inflow port 74, and a coolant outflow port 75.

The motor 72 is provided as a power source of the second pump 62. When an electric power is supplied, the motor 72 outputs a rotational motion about a virtual central axis 102. The impeller 73 is provided away from the motor 72 in the axial direction of the central axis 102. The shaft 76 extends along the central axis 102, and both ends thereof are connected to the motor 72 and the impeller 73. The shaft 76 transmits the rotational motion output from the motor 72 to the impeller 73. The impeller 73 rotates about the central axis 102 in response to the rotational motion transmitted from the shaft 76.

The coolant inflow port 74 opens at one end of the second pump 62 in the axial direction of the central axis 102. The first pipe 71 is connected to the coolant inflow port 74. The coolant outflow port 75 opens at a position spaced apart from the central axis 102 in the radial direction. The coolant outflow port 75 is connected to a pipe which constitutes the first flow channel 51 and extends toward the first filter 41.

The second pump 62 is installed in the space 37 in such a manner that the shaft 76 (the central axis 102) extends in the horizontal direction.

The first filter 41 is configured to remove any foreign matter such as sludge or chips contained in the coolant flowing through the first flow channel 51. For example, the first filter 41 is a cyclone filtration device that separates the coolant and any foreign matter such as sludge or chips contained in the coolant by centrifugal force. The first filter 41 may be supported by the second tank 31.

When the second pump 62 is operated, a coolant flow is formed in the first flow channel 51. When the coolant flowing through the first flow channel 51 passes through the first filter 41, any foreign matter such as sludge or chips contained in the coolant is removed. Thus, clean coolant is supplied via the first flow channel 51.

The coolant treatment apparatus 10 further includes a second flow channel 52, a first coolant discharge unit 46, and a first pump 61.

The second flow channel 52 is branched from the first flow channel 51. The coolant from the first flow channel 51 flows through the second flow channel 52. The first coolant discharge unit 46 discharges the coolant toward a machining point of the workpiece. The first pump 61 is provided on the path of the second flow channel 52. The first pump 61 is configured to pump the coolant toward the first coolant discharge unit 46.

The second flow channel 52 is configured to allow the coolant to flow therethrough, and is constituted by a pipe member such as a steel pipe or a hose. The second flow channel 52 is connected to the first flow channel 51 and a third flow channel 53 (which will be described later) at the branch 56 via various pipe joints. The branch 56 is disposed on the downstream side of the coolant flow in the first flow channel 51 than the first filter 41. The second flow channel 52 extends between the branch 56 and the first coolant discharge unit 46.

The first coolant discharge unit 46 is provided in the machine tool main body 110. The first coolant discharge unit 46 discharges coolant in the machining area 120. The first coolant discharge unit 46 is provided in the tool spindle 88. The first coolant discharge unit 46 is a spindle-through type coolant discharge device that discharges coolant from a cutting edge of a tool T held by the tool spindle 88. Generally, the first coolant discharge unit 46 supplies the coolant to the machining point of the workpiece to suppress heat generation at the machining point of the workpiece and lubricate both the workpiece and the tool T.

The first pump 61 is an in-line pump that linearly pumps the coolant in the second flow channel 52.

With this configuration, the coolant which is cleaned by the first filter 41 and flows through the first flow channel 51 is supplied to the first coolant discharge unit 46 through the second flow channel 52. In particular, in the present embodiment, since the first coolant discharge unit 46 is a spindle-through type coolant discharge device, the coolant flow channel is narrow. Therefore, it is possible to prevent the coolant flow channel in the first coolant discharge unit 46 from being clogged by supplying the clean coolant.

The coolant treatment apparatus 10 further includes a third flow channel 53 and a second coolant discharge unit 47.

The third flow channel 53 is branched from the first flow channel 51. The coolant from the first flow channel 51 flows through the third flow channel 53. The coolant from the third flow channel 53 is supplied to the second coolant discharge unit 47. The second coolant discharge unit 47 discharges the coolant supplied from the third flow channel 53. The second filter 42 built in the chip conveyor 11 is cleaned by the coolant discharged from the second coolant discharge unit 47.

The third flow channel 53 is configured to allow the coolant to flow therethrough, and is constituted by a pipe member such as a steel pipe or a hose. The third flow channel 53 extends between the branch 56 and the second coolant discharge unit 47.

The second coolant discharge unit 47 is constituted by a nozzle. The second coolant discharge unit 47 is disposed inside the second filter 42 which has a cylindrical shape. The second coolant discharge unit 47 opens opposite to the second filter 42. The second coolant discharge unit 47 discharges the coolant toward the second filter 42 rotating about the central axis 101 so as to remove any foreign matter such as sludge or chips from the second filter 42.

In the present embodiment, the coolant which is cleaned by the first filter 41 and flows through the first flow channel 51 is supplied to the second coolant discharge unit 47 through the third flow channel 53. By ejecting the clean coolant from the second coolant discharge unit 47 toward the second filter 42, it is possible to efficiently remove any foreign matter from the second filter 42, and it is possible to more reliably prevent the second filter 42 from being clogged.

The coolant treatment apparatus 10 further includes a fourth flow channel 54 and a flow control unit 66. The fourth flow channel 54 is branched from the third flow channel 53. The fourth flow channel 54 guides the coolant from the third flow channel 53 to the first tank 21. The flow control unit 66 is provided on the path of the fourth flow channel 54. The flow control unit 66 acts as a resistance to the coolant flow in the fourth flow channel 54.

The fourth flow channel 54 is configured to allow the coolant to flow therethrough, and is constituted by a pipe member such as a steel pipe or a hose. The fourth flow channel 54 is connected to the third flow channel 53 at a branch 57 via various pipe joints. The branch 57 is disposed on the downstream side of the coolant flow in the third flow channel 53 than the branch 56 and on the upstream side of the coolant flow in the third flow channel 53 than the second coolant discharge unit 47. The fourth flow channel 54 extends between the branch 57 and the first tank 21.

The flow control unit 66 is constituted by a check valve that acts as a resistance to the coolant flow in the fourth flow channel 54 so as to allow the coolant to flow from the branch 57 to the first tank 21 and prohibit the coolant from flowing back to the branch 57 from the first tank 21. The flow control unit 66 is not limited to the check valve described above, and may be constituted by, for example, an orifice which narrows a conduit so that the conduit has a relatively large flow channel area on the side of the branch 57 and a relatively small flow channel area on the side of the first tank 21.

Since the second coolant discharge unit 47 constituted by a nozzle has a narrowed discharge port, most of the coolant flowing through the third flow channel 53 flows from the branch 57 into the fourth flow channel 54, and thereby the discharge pressure of the coolant from the second coolant discharge unit 47 may be insufficient. However, since the flow control unit 66 in the fourth flow channel 54 acts as a resistance to the coolant flow in the fourth flow channel 54, allowing the coolant flowing through the third flow channel 53 to flow from the branch 57 toward both the second coolant discharge unit 47 and the first tank 21. Thereby, it is possible to appropriately control the pressure of coolant discharged from the second coolant discharge unit 47 toward the second filter 42.

The coolant treatment apparatus 10 further includes a fifth flow channel 55 and a third pump 63. The fifth flow channel 55 extends between the first tank 21 and the second tank 31. The third pump 63 is provided on the path of the fifth flow channel 55. The third pump 63 is configured to pump the coolant from the first tank 21 toward the second tank 31 through the fifth flow channel 55.

The fifth flow channel 55 is configured to allow the coolant to flow therethrough, and is constituted by a pipe member such as a steel pipe or a hose. The third pump 63 is provided on the first tank 21. The third pump 63 is a drawing pump that sucks the coolant stored in the first tank 21 and pumps the coolant toward the second tank 31. The third pump 63 is provided at an end of the fifth flow channel 55 on the side of the first tank 21.

Thus, an annular coolant circulation path is formed by connecting the first tank 21, the fifth flow channel 55, the second tank 31, the first flow channel 51, the third flow channel 53, and the fourth flow channel 54 in this order. By operating the third pump 63 and the second pump 62, the coolant is circulated in the coolant circulation path. During this time, the coolant passes through the first filter 41, whereby the coolant stored in the first tank 21 and the second tank 31 can be cleaned.

FIG. 5 is a block diagram illustrating a control system of the machine tool equipped with the coolant treatment apparatus illustrated in FIG. 1. With reference to FIGS. 1 and 5, the coolant treatment apparatus 10 further includes a first pressure detection unit 97, a second pressure detection unit 98, and a controller 91.

The first pressure detection unit 97 is provided on the path of the second flow channel 52. The first pressure detection unit 97 is provided on the path of the second flow channel 52 between the first pump 61 and the first coolant discharge unit 46. The first pressure detection unit 97 is a pressure sensor configured to detect a pressure of the coolant. The first pressure detection unit 97 detects the pressure of the coolant to be supplied toward the first coolant discharge unit 46.

The second pressure detection unit 98 is provided on the path of the third flow channel 53. The second pressure detection portion 98 is provided on the path of the third flow channel 53 between the branch 57 and the second coolant discharge unit 47. The second pressure detection unit 98 is a pressure sensor configured to detect a pressure of the coolant. The second pressure detection unit 98 detects the pressure of coolant to be supplied toward the second coolant discharge unit 47.

The controller 91 controls the machine tool 100. The controller 91 is mounted on the machine tool 100, and more specifically is installed in a control panel for controlling various operations of the machine tool 100.

The controller 91 includes a program storage unit 92, a program execution unit 93, a tool spindle control unit 94, a table control unit 95, and a pump control unit 96.

The program storage unit 92 stores execution programs (numerical control programs) created by an operator of the machine tool 100 for the workpiece machining. The program storage unit 92 is, for example, a flash memory.

The program execution unit 93 executes an execution program stored in the program storage unit 92. The program execution unit 93 reads an instruction of the execution program and outputs a control signal to each of the tool spindle control unit 94, the table control unit 95, and the pump control unit 96.

The tool spindle control unit 94 receives a control signal from the program execution unit 93 to control a tool spindle motor 81 for rotating the tool spindle 88 and a tool spindle moving motor 82 for moving the tool spindle 88. The table control unit 95 receives a control signal from the program execution unit 93 to control a table moving motor 83 for moving the table 89. The pump control unit 96 receives a control signal from the program execution unit 93 to control a motor 85 for operating the first pump 61, a motor 72 for operating the second pump 62, and a motor 87 for operating the third pump 63.

The control signal input from the program execution unit 93 to the pump control unit 96 includes a signal defining the discharge pressure of the coolant from the first coolant discharge unit 46. A signal indicating the pressure of the coolant detected by the first pressure detection unit 97 is input to the pump control unit 96. The pump controller 96 controls the output of the first pump 61 based on the pressure of the coolant detected by the first pressure detection unit 97.

More specifically, the pump controller 96 controls the frequency of an inverter for supplying electric power to the motor 85. When the pressure of the coolant detected by the first pressure detection unit 97 is smaller than the discharge pressure of the coolant defined by the control signal from the program execution unit 93, the pump control unit 96 controls the frequency of the inverter to increase the output of the motor 85, and when the pressure of the coolant detected by the first pressure detection unit 97 is larger than the discharge pressure of the coolant defined by the control signal from the program execution unit 93, the pump control unit 96 controls the frequency of the inverter to decrease the output of the motor 85.

For example, the flow rate of the coolant discharged from the first coolant discharge unit 46 is in the range of 0 L to 22 L.

In the present embodiment, by operating the first pump 61 which is provided on the path of the second flow channel 52, the coolant flowing through the first flow channel 51 can be preferentially supplied to the first coolant discharge unit 46 through the second flow channel 52. Thus, the discharge pressure of the coolant from the first coolant discharge unit 46 can be appropriately controlled to a value defined by the control signal from the program execution unit 93.

A signal indicating the pressure of the coolant detected by the second pressure detection unit 98 is further input to the pump control unit 96. The coolant discharge pressure from the second coolant discharge unit 47 is determined in advance (for example, 40 kPa). The pump controller 96 controls the output of the second pump 62 based on the pressure of the coolant detected by the second pressure detection unit 98.

More specifically, the pump controller 96 controls the frequency of an inverter for supplying electric power to the motor 72. When the pressure of the coolant detected by the second pressure detection unit 98 is lower than the predetermined discharge pressure of the coolant from the second coolant discharge unit 47, the pump control unit 96 controls the frequency of the inverter to increase the output of the motor 72, and when the pressure of the coolant detected by the second pressure detection unit 98 is higher than the predetermined discharge pressure of the coolant from the second coolant discharge unit 47, the pump control unit 96 controls the frequency of the inverter to decrease the output of the motor 72.

With this configuration, the coolant can be discharged from the second coolant discharge unit 47 toward the second filter 42 at a pressure within an appropriate range. As a result, it is possible to prevent the second filter 42 from being insufficiently cleaned due to an excessively small discharge pressure of the coolant, or prevent the second filter 42 from being damaged due to an excessively large discharge pressure of the coolant.

In particular, in the present embodiment, when the discharge pressure of the coolant from the first coolant discharge unit 46 is set close to the maximum value, the proportion of the coolant flowing from the first flow channel 51 to the third flow channel 53 decreases, which may cause the discharge pressure of the coolant from the second coolant discharge unit 47 to decrease. In this case, the discharge pressure of the coolant from the second coolant discharge unit 47 can be appropriately maintained by increasing the output of the second pump 62 that pumps the coolant from the second tank 31 toward the first flow channel 51.

To summarize the structure of the coolant treatment apparatus 10 according to the present embodiment described above, the coolant treatment apparatus 10 according to the present embodiment includes a first flow channel 51 through which coolant flows, a first filter 41 which is provided on the path of the first flow channel 51, a second flow channel 52 which is branched from the first flow channel 51 and through which coolant from the first flow channel 51 flows, a first coolant discharge unit 46 which discharges the coolant toward the machining point of a workpiece, a first pump 61 which is provided on the path of the second flow channel 52 and configured to pump the coolant toward the first coolant discharge unit 46, a second coolant discharge unit 47 which discharges the coolant supplied from the third flow channel 53, and a second filter 42 which is cleaned by the coolant discharged from the second coolant discharge unit 47.

According to the coolant treatment apparatus 10 of the present embodiment described above, since the coolant flowing through the first flow channel 51 is preferentially supplied to the first coolant discharge unit 46 through the second flow channel 52 by operating the first pump 61, the discharge pressure of the coolant in the first coolant discharge unit 46 can be appropriately controlled.

In the present embodiment, it has been described that the first coolant discharge unit of the present invention is a spindle-through type coolant discharge device, but the present invention is not limited thereto, and for example, the first coolant discharge unit may be a coolant discharge device that discharges coolant from a cutting edge of a tool held by a tool rest, or may be a coolant discharge device that discharges coolant from a spindle end face of a tool spindle. The second coolant discharge unit of the present invention may be a nozzle that discharges coolant toward a filter built in a mist collector.

It should be understood that the embodiments and the examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The present invention is applied, for example, to a coolant treatment apparatus used in a machine tool.

REFERENCE SIGNS LIST

10: coolant treatment apparatus; 11: chip conveyor; 12: horizontal portion; 13: chip reception port; 14: rising portion; 16: chip discharge port; 19: cover body; 20, 30: storage space; 21: first tank; 22, 32: bottom portion; 23, 33: side portion; 31: second tank; 34: top portion; 35: pillar; 36: plate; 37: space; 41: first filter; 42: second filter; 46: first coolant discharge unit; 47: second coolant discharge unit; 51: first flow channel; 52: second flow channel; 53: third flow channel; 54: fourth flow channel; 55: fifth flow channel; 56, 57: branch; 61: first pump; 62: second pump; 63: third pump; 66: flow control unit; 71: first pipe; 72, 85, 87: motor; 73: impeller; 74: coolant inflow port; 75: coolant outflow port; 76: shaft; 81: tool spindle motor; 82: tool spindle feed motor; 83: table feed motor; 88: tool spindle; 89: table; 91: controller; 92: program storage unit; 93: program execution unit; 94: tool spindle control unit; 95: table control unit; 96: pump control unit; 97: first pressure detection unit; 98: second pressure detection unit; 100: machine tool; 101, 102: central axis; 110: machine tool main body; 120: machining area

The invention claimed is:

1. A coolant treatment apparatus, comprising:
- a first flow channel through which coolant flows;
- a first filter which is provided on the path of the first flow channel;
- a second flow channel which is branched from the first flow channel and through which the coolant from the first flow channel flows;
- a first coolant discharge unit which discharges the coolant toward a machining point of a workpiece;
- a first pump which is provided on the path of the second flow channel and configured to pump the coolant toward the first coolant discharge unit;
- a third flow channel which is branched from the first flow channel and through which the coolant from the first flow channel flows;
- a second coolant discharge unit which discharges the coolant supplied from the third flow channel; and
- a second filter which is cleaned by the coolant discharged from the second coolant discharge unit.

2. The coolant treatment apparatus according to claim 1, further comprising:
- a first tank which is configured to store coolant; and
- a chip conveyor which is housed in the first tank and configured to receive chips and coolant discharged from a machine tool main body,
- wherein the second filter is built in the chip conveyor and is provided on the path of a coolant flow from the chip conveyor toward the first tank.

3. The coolant treatment apparatus according to claim 2, further comprising:
- a fourth flow channel which is branched from the third flow channel and configured to guide the coolant from the third flow channel to the first tank; and
- a flow control unit which is provided on the path of the fourth flow channel and acts as a resistance to a coolant flow in the fourth flow channel.

4. The coolant treatment apparatus according to claim 3, further comprising:
- a second tank which is configured to store coolant and is connected to the first flow channel;
- a second pump which is provided on the path of the first flow channel and configured to pump the coolant stored in the second tank toward the first filter;
- a fifth flow channel which is provided between the first tank and the second tank; and
- a third pump which is provided on the path of the fifth flow channel and configured to pump the coolant from the first tank toward the second tank.

5. The coolant treatment apparatus according to claim 4, further comprising:

a pressure detection unit which is provided on the path of the third flow channel and configured to detect a pressure of the coolant supplied to the second coolant discharge unit; and a controller which controls an output of the second pump based on the pressure of the coolant detected by the pressure detection unit.

* * * * *